Oct. 14, 1969 W. L. GRANTHAM 3,473,116
MEANS FOR MEASURING THE ELECTRON DENSITY GRADIENTS OF THE
PLASMA SHEATH FORMED AROUND A SPACE VEHICLE
Filed Jan. 30, 1967 2 Sheets-Sheet 1

INVENTOR
WILLIAM L. GRANTHAM

BY

ATTORNEYS

United States Patent Office 3,473,116
Patented Oct. 14, 1969

3,473,116
MEANS FOR MEASURING THE ELECTRON DENSITY GRADIENTS OF THE PLASMA SHEATH FORMED AROUND A SPACE VEHICLE
William L. Grantham, Yorktown, Va., assignor to the United States of America as represented by the Administrator of the National Aeronautics and Space Administration
Filed Jan. 30, 1967, Ser. No. 612,740
Int. Cl. G01r 27/04
U.S. Cl. 324—58.5
2 Claims

ABSTRACT OF THE DISCLOSURE

Technique for measuring electron density gradients of the plasma sheath formed around the surface of a space vehicle as it enters or leaves a planetary atmosphere. Several different frequencies are emitted into the plasma sheath and the phase difference between the transmitted energy and reflected energy for each of the frequencies is measured. This phase difference is proportional to the distance from the space vehicle to the critical density boundary for each frequency. Hence, by emitting each of the several frequencies from different locations around the space vehicle electron density gradients of the plasma sheath can be determined. A power meter is used to measure the power of the reflected energy for each frequency to determine if the critical density boundary for the frequency exists in the plasma sheath.

---

Figure 1:
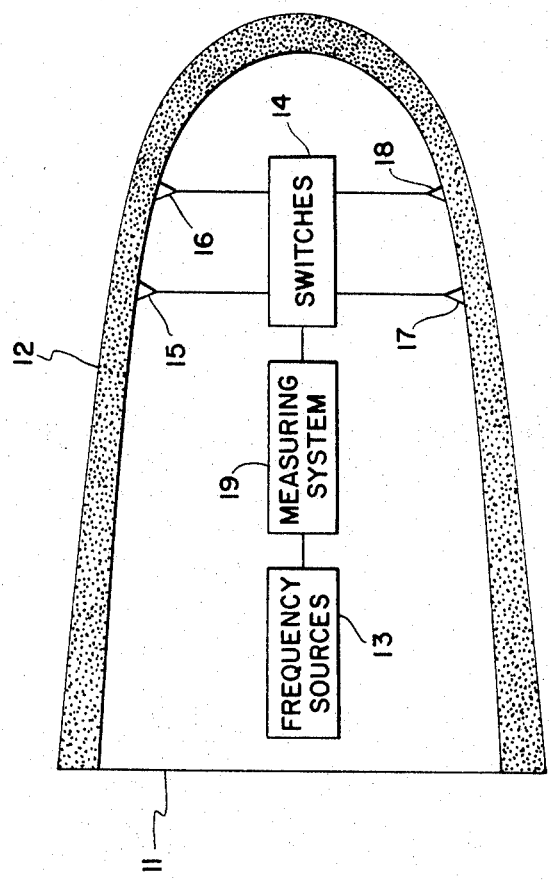

The invention described herein was made by an employee of the U.S. Government and may be manufactured and used by or for the Government for governmental purposes without the payment of any royalties thereon or therefor.

The invention relates generally to a technique for measuring the electron density of a layer of plasma and more particularly concerns a technique for measuring electron density gradients of the plasma sheath formed near the surface of a hypersonic vehicle as it enters or leaves a planetary atmosphere.

It is well known that when a space vehicle reenters the earth's atmosphere a plasma sheath is formed near the surface of the vehicle. This plasma sheath attenuates the radio waves that are transmitted to or from the vehicle and hence creates a communications problem. There have been several techniques used in the past that provide a partial solution to the reentry communication problem. However, to date there is not an adequate solution. If the reentry communication problem is to be adequately solved, much more knowledge is going to have to be obtained about the characteristics of the plasma sheath. Then a systematic approach can be taken which, hopefully, will provide an adequate solution to the problem. The characteristic of the plasma sheath which is most important to the reentry communication problem is the electron density of the sheath. At what distances from the surface of the space vehicle do the critical density boundaries for different frequencies occur? How do these distances vary relative to the different locations around the space vehicle? How do these distances vary with time? The answers to these and other related questions will provide information which will be helpful in solving the reentry communication problem of space vehicles.

It is therefore the primary purpose of this invention to provide a technique for measuring the electron density gradient of the plasma sheath formed around a space vehicle as it reenters the earth's atmosphere. The measurements are made at different times and locations on the surface of a spacecraft during an actual or simulated flight. Thus, information is provided about the characteristics of the plasma sheath which can be utilized to solve the reentry communication problem. Also, this information is valuable for aerodynamic and structural design.

Figure 2:
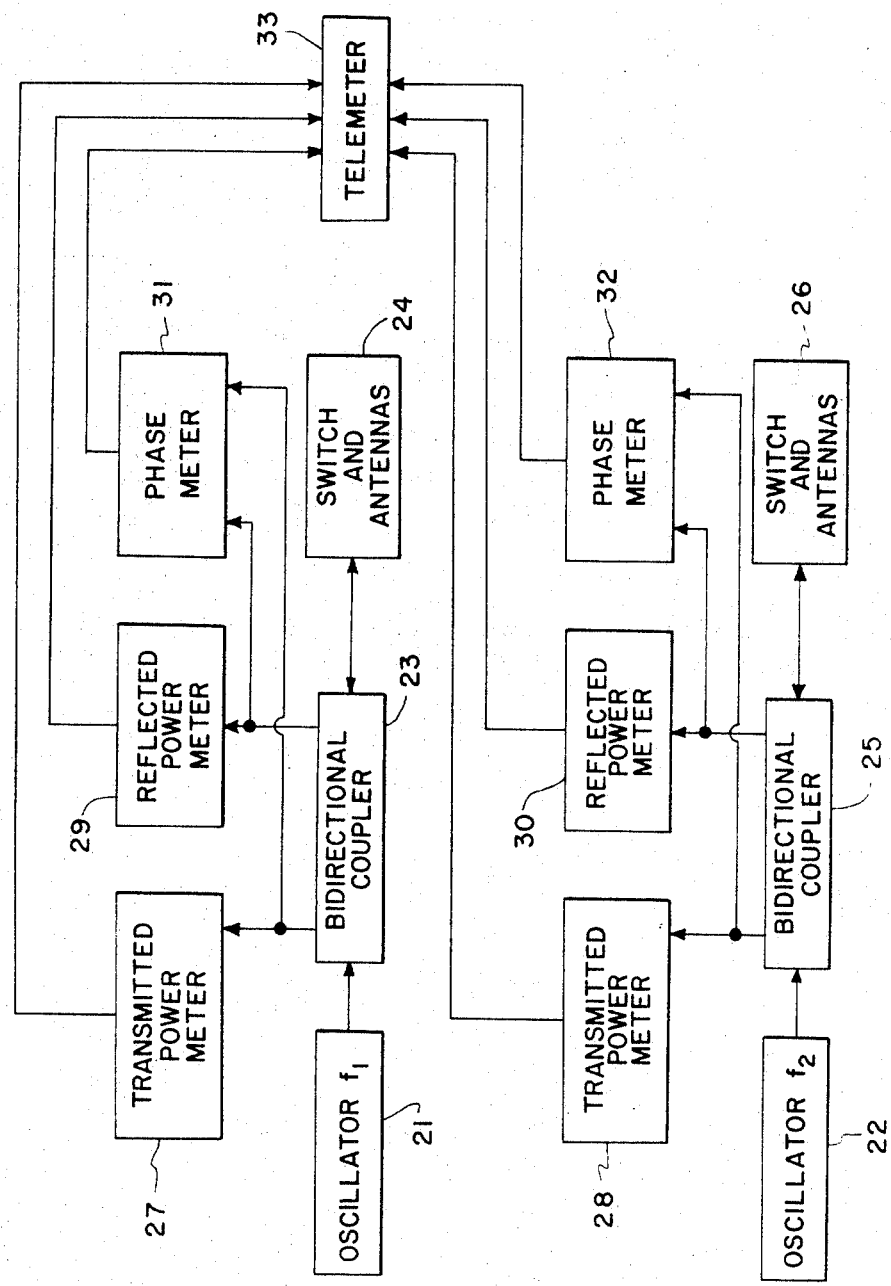

Other objects and advantages of this invention will further become apparent hereinafter and in the drawings in which:

FIG. 1 is a block and schematic diagram showing the purpose of the invention; and FIG. 2 is a block diagram of the invention.

In describing the embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose.

During the time that a space vericle is either leaving or entering a planetary atmosphere the electron density of the plasma sheath formed around the space vehicle increases to a maximum value and then decreases to zero. This invention is a microwave reflectometer system that monitors at several different frequencies the occurrence and decay of the critical electron density of the plasma sheath. The invention sends radio waves into the plasma sheath which will propagate into the plasma to its critical density. At the critical density boundary, the waves are totally reflected due to the sharp impedance change at that point. This type of interaction is typical of plasmas when the collision frequency is low and the electron density gradient is sharp with respect to wavelength. The higher the frequency of the radio wave, the deeper the radio wave will penetrate the plasma before it reaches the critical density boundary. The wave transmitted into the plasma is totally reflected only if its critical density exisits in the plasma. Otherwise, the radio wave passes through the plasma sheath unimpeded. If the critical density exists in the plasma, the phase difference between the reflected power and the transmitted power is measured. This phase difference is proportional to the distance from the transmitting-receiving antenna in the reflectometer system to the critical density boundary.

Turning now to the embodiment of the invention selected for illustration in the drawing, the number 11 designates a space vehicle and the number 12 indicates the plasma sheath formed around the space vehicle as it leaves or enters a planetary atmosphere. Frequency sources 13, which consists of several oscillators, are applied through switches 14 to antennas 15–18. These antennas are flush with the surface of the space vehicle and emit certain frequencies into the plasma sheath. The frequencies for which the critical densities do not exist in the plasma pass on through the plasma. However, those frequencies for which the critical densities do exist will be reflected and received by the same antenna that transmitted it. This received energy is applied to a measuring system which measures the transmitted power, the reflected power and the phase difference between the transmitted and reflected power for each of the frequencies in frequency source 13. These measurements are recorded and transmitted to earth by means not shown. Even though only four antennas are shown, it should be realized that any number of antennas at many other locations on the surface of the space vehicle can be used without departing from the invention.

Referring now to FIG. 2, there is shown a block diagram of an embodiment of the invention that uses only two frequency sources. However, a much larger number could be used. The two frequency sources, oscillators 21 and 22, produce frequencies $f_1$ and $f_2$, respectively. The output from oscillator 21 is applied through a bidirectional coupler 23 to a switch and antenna 24; and the output from oscillator 22 is applied through a bidirectional coupler 25 to a switch and antennas 26. Each of the switches and antennas 24 and 26 consists of a switch and several antennas. The switch can be used to connect the output from the corresponding bidirectional coupler to any one of the several antennas. If only one antenna is used the antenna can be connected directly to the bidirectional coupler thereby eliminating the need for the switch.

The transmitted power from oscillators 21 and 22 are measured by transmitted power meters 27 and 28, respectively; and the reflected power is measured by reflected power meters 29 and 30. The phase difference between the transmitted and reflected powers are measured by phase meters 31 and 32. The outputs from meters 27–32 are applied to a telemeter 33 for transmission to earth.

In the operation of the embodiment of the invention shown in FIG. 2, oscillator 21 produces a frequency $f_1$. This frequency is applied through bidirectional coupler 23 and switch 24 to a selected antenna. The frequency $f_1$ is emitted by the antenna into the sheath of plasma surrounding the space vehicle. If the critical density for the frequency $f_1$ does not exist in the sheath of plasma, the frequency will pass through the plasma unimpeded and none will be reflected. However, if the critical density for the frequency $f_1$ does exist, the frequency will be totally reflected back to the antenna. The reflected frequency passes through the antenna and the bidirectional coupler 23 to meter 29 where its power is measured. Meter 27 measures the power of the transmitted frequency $f_1$. Hence, by comparing the outputs of meters 27 and 29 it can be determined if the critical density for the frequency $f_1$ exists in the plasma sheath. If the critical density for the frequency $f_1$ does exist then the phase meter 31 will measure the phase difference of the transmitted power and the reflected power. This phase difference is proportional to the distance from the surface of the space vehicle to the critical density boundary. Thus, if several different frequency sources are used and several antennas are located at difference locations on the surface of the space vehicle the distances of the critical density boundaries from the space vehicle 11 for difference frequencies, times and locations can be determined.

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims. Even though only two frequency sources and four antennas are shown, any desired number can be used; switches 24 and 26 can be automatic with any desired program; and switches 24 and 26 can be eliminated by providing a complete system for each frequency and each antenna location all without departing from the spirit and scope of this invention.

What is claimed is:

1. Means for measuring the electron density gradients of the plasma sheath formed around the surface of a space vehicle as it enters or leaves a planetary atmosphere comprising: means on said space vehicle for generating a plurality of different frequency signals; antenna means mounted at several locations on the surface of said space vehicle for emitting said generated signals into said plasma sheath and for receiving the reflected signals; a bidirectional coupling means and a switch associated with each of said plurality of signals for selectively connecting that signal to said antenna means at each of said several locations; and means connected to each of said bidirectional coupling means for measuring the phase difference between the corresponding generated signal and the signal reflected back to the antenna means whereby the measured phase differences are proportional to the distances from the surface at the selected locations on the space vehicle to the critical density boundary for the frequencies of the different signals.

2. Means for measuring the electron density gradients of the plasma sheath formed around the surface of a space vehicle as it enters or leaves a planetary atmosphere according to claim 1 wherein means associated with each of said different frequency signals is connected to the corresponding bidirectional coupling means for measuring the power of the generated and the reflected signals whereby determination can be made as to whether or not the critical density for the frequency of each of the generated signals exists in the plasma sheath.

References Cited

UNITED STATES PATENTS

| | | |
|---|---|---|
| 2,596,530 | 5/1932 | Clarke. |
| 3,233,172 | 2/1966 | Luoma. |
| 3,317,826 | 5/1967 | Knop et al. |

RUDOLPH V. ROLINEC, Primary Examiner

P. F. WILLE, Assistant Examiner